Jan. 25, 1944.   E. F. BRUNNER   2,340,258
TIRE
Filed Nov. 28, 1940
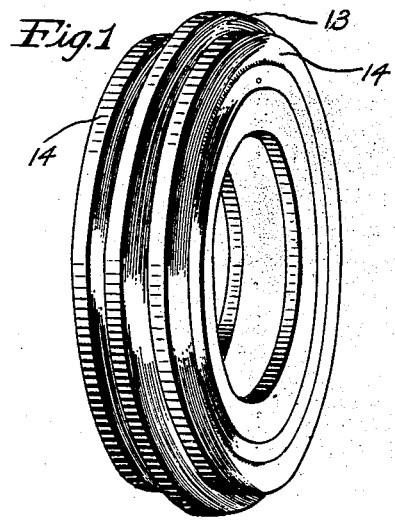
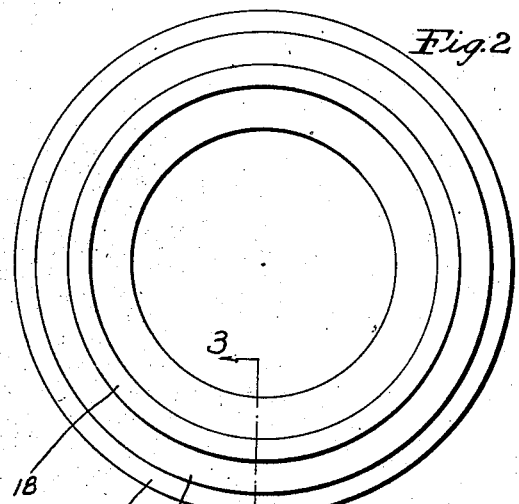
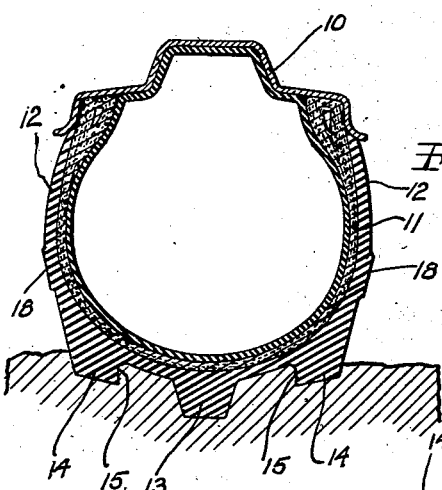
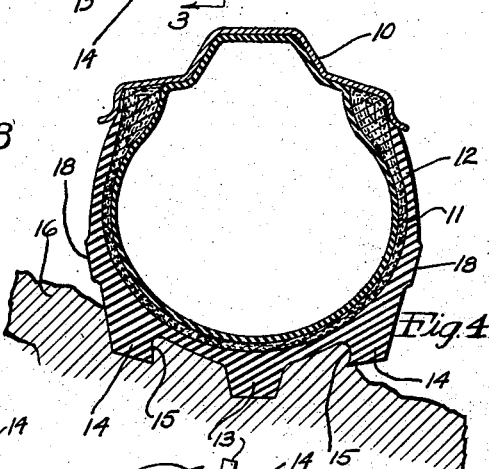
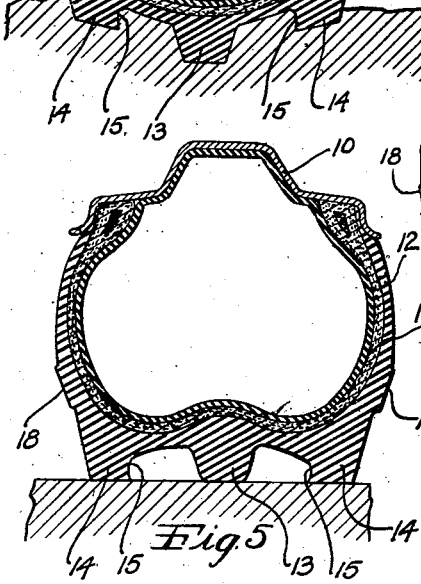
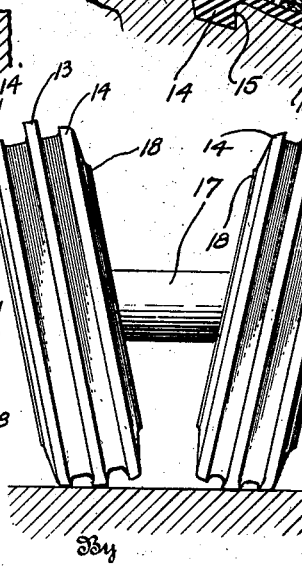
Inventor
Elmer F. Brunner Patented Jan. 25, 1944

2,340,258

UNITED STATES PATENT OFFICE 2,340,258

TIRE

Elmer F. Brunner, Silver Lake, Ohio, assignor to Wingfoot Corporation, Akron, Ohio, a corporation of Delaware Application November 28, 1940, Serial No. 367,495

1 Claim. (Cl. 152—209)

The present invention relates to a tire, and particularly a tire to be used on the front wheel of a tractor to guide the tractor in the tilling of the soil, particularly in the cultivation of row crops. Some farms are somewhat hilly and when operating on the slopes of these hills in a substantially horizontal plane there is a tendency for the tractor to slide sidewise, due to the slope of the hill, thus preventing proper cultivation of the soil.

It is therefore an object of this invention to provide a tire for the guiding wheel of a tractor which will guide the tractor in a uniform manner and prevent side slippage of the same.

It is also an object of this invention to provide a tire which will give good traction on a slope regardless of which way the tractor is moving along that slope, and yet have a tire that primarily has a central rib which digs into the soil and forms a track which guides the tire and, as a result, the tractor in the desired direction.

Another object of this invention is to provide a tractor tire of the class described which, when operating on the highway, will give ample traction, may be reversed for wear, and in which the load is carried at the side edges by the side walls of the tire.

It is another object of this invention to provide in a tire of this character an outer tread portion, the total width of which is substantially that of the rim upon which it is mounted, the tire having side walls which extend substantially radially so as to carry to a great extent the vertical load on the tire.

Another object of this invention is to provide a tire of this character for a tractor in which two pilot wheels are used at the front of the tractor, but angled at a substantial angle with respect to each other and to a vertical plane midway between them. The tire which I have invented is particularly adapted for a construction of this kind and gives ample traction, both on the highway and for proper cultivation of the soil.

Other objects of this invention will appear hereinafter as the description hereof proceeds, the novel features, arrangements and combinations being clearly set forth in the specification and in the claim thereunto appended.

In the drawing,

Fig. 1 is a perspective view of a tire embodying my invention,

Fig. 2 is a side elevation of the tire shown in Fig. 1,

Fig. 3 is a cross-section substantially along line 3—3 in Fig. 2, but showing the tire actually in ground-contacting engagement, Fig. 4 is a view similar to Fig. 3, but showing the action of the tire when used on a slope, Fig. 5 is a view similar to Fig. 3 showing the tire in operation on a highway, and Fig. 6 is a front elevation of two tires embodying my invention mounted on the front axle of a tractor utilizing two wheels angled outwardly from each other at their upper edges.

In the drawing I have shown my tire applied to a steel rim 10 of the drop-center type, although this is not in any way intended to be limiting as to my invention. The tire, embodying the usual tire carcass 11 and rubber side walls 12 vulcanized thereto, is provided with a tread portion having a central rib 13 and two identical side ribs 14, which are spaced from the central rib 13 a distance which is at least substantially equal to the width of the central rib 13. This permits the central rib 13 to dig into the soil and permit some lateral flow of the soil outward toward the ribs 14. These ribs 14, however, limit the flow of the soil outwardly away from the rib 13 so that the rib 13 will be positively guided in the groove which it forms. In softer soil the ribs 14 also dig in and provide additional means for preventing side slippage of the tire and consequently of the tractor.

The central rib 13 is substantially trapezoidal in cross-section with the sides thereof sloping slightly, so as to provide self-cleaning of the rib and of the space between it and the ribs 14.

As will be noted particularly in Figs. 3 and 4 the inner side faces 15 of the ribs 14 are substantially radial for a purpose which is more clearly illustrated in Fig. 4 in which the tire is operating on a slope 16. In this operation there is a tendency for the tire and wheel to slip down the slope laterally of the movement of the tractor and therefore a tire used for this purpose must prevent this lateral movement and, while only one rib 14 and the central rib 13 bites into the soil, the outer rib 14 at the right forms a stop for the soil which is pushed laterally away by the central rib 13 and therefore gives that central rib greater traction.

It will be noted in these figures that the extent of the tread between the outer edges of the ribs 14 is substantially equivalent to the width of the rim 10. This causes the load when placed on ribs 14 to be transmitted to the rim in a substantially radial direction. The ribs 14 extend radially only to about the radial distance to the base of rib 13 and recede slightly toward the outer edges of the tire tread.

In operating on a highway the central rib is forced inwardly as clearly illustrated in Fig. 5, and the outer ribs 14 come into ground-contacting engagement with the highway and help to support the load of the tractor and thus eliminate some wear on the central rib 13. This is particularly true in view of the fact that these tires operate at relatively low pressures and a concentrated load on the central rib 13 causes that rib to move inwardly until the ribs 14 contact the road and give increased traction surface. As the ribs 14 move into engagement with the highway, the surfaces thereof tend to flatten out parallel with the pavement, due to inward deflection of the tire at the center.

In Fig. 6 I have illustrated a form of my invention in which two tires A are mounted on a central axis 17. These two tires are arranged so that their lower ground-contacting surfaces are spaced apart from each other a very substantial distance less than the spacing of the top sides of these tires. With the particular design of tire which I have shown, it will be noted that, generally speaking, two ribs—one central and one outer rib—are in ground-contacting engagement during movement along the highway and both dig into the soil when the tractor is being used for farming purposes. Due to the symmetry of the tires, the same may be interchanged and reversed to distribute the wear uniformly on all ribs.

The ribs are made continuous in a lengthwise direction to prevent the accumulation of soil between the ribs. To prevent weakening of the side walls by abrasion each of the side walls is provided intermediate the tread and bead areas with ribs 18 which project outwardly from the side of the tire.

Other combinations and arrangements of the parts may be made within the scope of this invention without departing from the spirit thereof and therefore I do not wish to be limited except as may hereinafter be set forth in the claim hereunto appended.

Having thus fully described my invention, what I claim and desire to secure by Letters Patent of the United States is:

A pneumatic tire including a flexible rubber and fabric carcass and a rib tread on the carcass, said tread including a relatively-large, centrally-positioned, longitudinally-continuous, cross-sectionally trapezoidal rib of a radial thickness substantially equal to its width, said rib engaging with the remainder of th tire or tread only by the integral engagement of its base, and relatively large side ribs positioned on opposite sides of the first-named rib and at an unobstructed space and distance from the first-named rib at least substantially equal to the width of the first-named rib, said side ribs being aligned with the beads of the tire in a direction perpendicular of the tire axis.

ELMER F. BRUNNER.